United States Patent [19]

Schreiber et al.

[11] Patent Number: 4,671,520
[45] Date of Patent: Jun. 9, 1987

[54] DEVICE FOR HOLDING WORKPIECES DURING MACHINING OPERATIONS

[75] Inventors: Jürgen Schreiber; Albrecht Guntram, both of Wetzlar, Fed. Rep. of Germany

[73] Assignee: Buderus AG, Wetzlar, Fed. Rep. of Germany

[21] Appl. No.: 801,636

[22] Filed: Nov. 25, 1985

[30] Foreign Application Priority Data

Nov. 29, 1984 [DE] Fed. Rep. of Germany ....... 3443487

[51] Int. Cl.⁴ .............................................. B23B 31/10
[52] U.S. Cl. .................................... 279/1 G; 279/123
[58] Field of Search ............... 279/1 A, 1 G, 123, 1 R

[56] References Cited

U.S. PATENT DOCUMENTS

| | | | |
|---|---|---|---|
| 1,882,871 | 10/1932 | Page | 279/1 G |
| 1,882,997 | 10/1932 | Scott | 279/1 G |
| 2,463,156 | 3/1949 | Day | 279/1 G |
| 2,543,117 | 2/1951 | Mackmann | 279/123 |

FOREIGN PATENT DOCUMENTS

| | | | |
|---|---|---|---|
| 2632442 | 1/1978 | Fed. Rep. of Germany | 279/1 G |
| 112744 | 8/1980 | Japan | 279/1 G |
| 8006 | 1/1982 | Japan | 279/1 R |
| 712203 | 1/1980 | U.S.S.R. | 279/1 G |
| 823006 | 4/1981 | U.S.S.R. | 279/1 G |

Primary Examiner—Gil Weidenfeld
Assistant Examiner—Daniel W. Howell
Attorney, Agent, or Firm—Karl F. Ross; Herbert Dubno

[57] ABSTRACT

It has been hitherto customary durig machining of workpiece, such a grinding of gear wheels, to slip a roller cage over the gear wheel. The chuck jaws of the chuck then hold the workpiece by way of the rollers in a roller cage. The time concuming operation is made superfluous by a holding ring which is mounted in the chuck. The holding ring has openings near the chuck jaws, and also has in this region fixedly installed roller-cage-type segments. Input guides at the holding ring allow quick, safe and secure exchange of the workpieces.

18 Claims, 5 Drawing Figures

DEVICE FOR HOLDING WORKPIECES DURING MACHINING OPERATIONS

FIELD OF THE INVENTION

Our present invention relates to a device for receiving and holding workpieces having an exterior configuration including gear teeth formations and, more particularly, to a device for holding workpieces during machining operations by means of the chuck jaws of a chuck. Specifically, the invention relates to an improved chuck for the external retention of a gear.

BACKGROUND OF THE INVENTION

It is customary to retain, i.e. clamp, gears or like workpieces in a chuck by the intervention of a roller cage. This roller cage is comprised of a metal ring with a row of rollers arranged on resilient wires. The individual roller rows are adapted to the gaps between the teeth of the gear wheels or gears. Such a roller cage is initially introduced into the gaps of the gear wheel and the cage is then introduced with the gear as an assembly into the chuck. The chuck jaws then engage the rollers and damage of the gears by the chuck is prevented.

During each workpiece replacement, in a special operational step, the roller cage must be slipped over the new workpiece. Following machining the workpiece, the roller cage must be taken off, and then cleaned, in order to be ready again for the next workpiece. Accordingly, the time required for workpiece exchange is relatively lengthy and furthermore automation of the workpiece exchange is nearly impossible.

OBJECTS OF THE IVENTION

It is accordingly an object of our invention to provide a device which allows an automatic and rapid workpiece exchange.

It is also an object of our invention to provide a device which enhances the maching accuracy.

Yet another object of this invention is to provide an improved chuck for the machining of gears.

SUMMARY OF THE INVENTION

These objects are attained in accordance with the invention with a holding ring which has openings or passages for the jaws of the chuck. The holding ring can be mounted on the chuck, and the ring can retain the respective workpiece. The holding ring is equipped with resiliently mounted and/or radially guided rollers, at least in the region of the openings, permanently mounted on the ring. The rollers, in turn, can rest in the gaps between teeth of the workpiece.

The device also can have input guides to assist in the mounting of the respective workpiece for the desired machining operation, i.e. in the aligning of the inter-tooth gaps with the rollers.

Preferably, the device includes, in the region of the openings of the holding ring, which openings passing the jaws of the chuck, a roller-bearing system of the type of roller cage segments.

Advantageously, the frontal surface of the holding ring, in the region of the roller cage segment, has a profile which is adapted to the teeth distribution of the workpiece to be treated, i.e. a complementary tooth profile.

The input guides on the frontal surface of the holding ring can be formed as interchangeable pre-sensor pins which project beyond the frontal surface.

In accordance with yet another feature, the pre-sensor pins are provided with radial tips which are adapted to the shape of the tooth gaps of the workpiece to be treated, and these tips have roof-like upper slides, i.e. a gabled or beveled configuration.

In the region of the roller cage segments, exit openings of a conduit are provided and deliver a cleaning medium, to ensure that during each loading and unloading operation this cleaning medium is directed upon and against the rollers of the roller cage segments.

The conduits for the cleaning medium pass through the jaws of the chuck, and the exit openings for the cleaning medium are directed onto the rollers of the roller cage segments.

In accordance with a further feature the loading and unloading of the workpiece can be done manually and-/or by machine using a manipulator device.

Thus, in general terms, the invention is concerned with a holding ring with fixedly mounted rollers. This ring can retain the respective workpiece, and it remains positively connected for a specific workpiece configuration to the chuck. Only the workpiece is introduced into and removed again from the chuck, and the attendant operations can be carried out relatively quickly and also automatically.

DESCRIPTION OF THE DRAWING

The above and other objects, features and advantages of our present invention will become more readily apparent from the following description, reference being made to the accompanying highly diagrammatic drawing, in which.

SPECIFIC DESCRIPTION

The device is especially intended to clamp or similarly hold workpieces having an exterior configuration including gear teeth formations, especially gear wheels or gears, during the machining by inner and/or outer cylindrical grinding.

Figure 2:
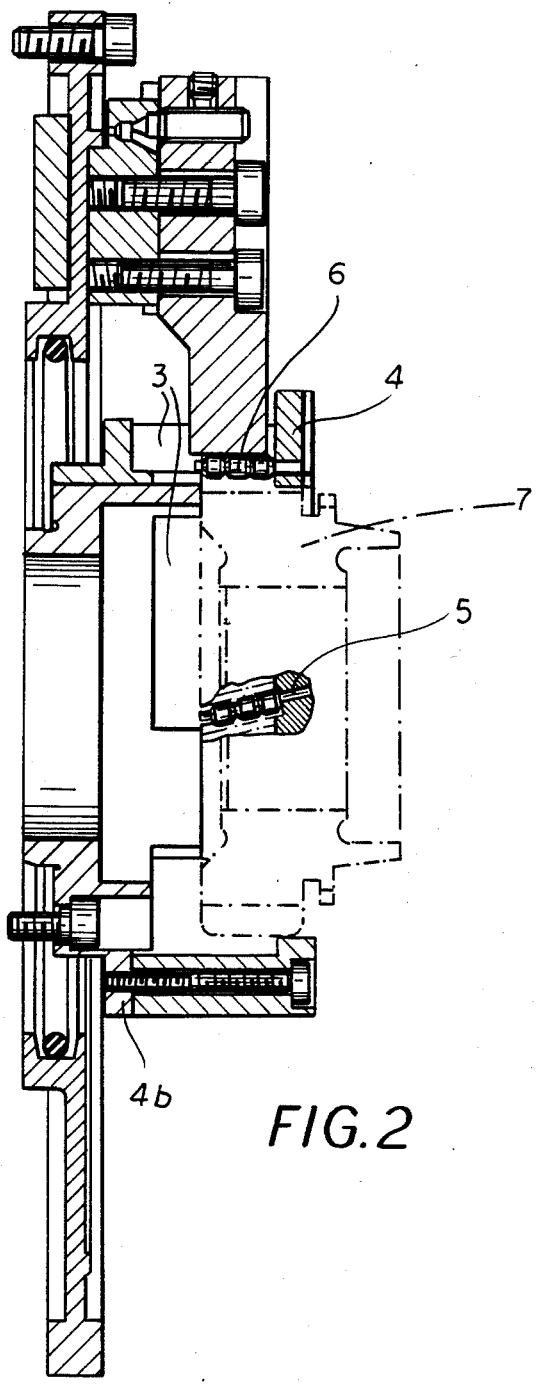
FIG. 2 is a cross section of the chuck taken along line II—II in the region of the chuck jaws in FIG. 1.
Figure 4:
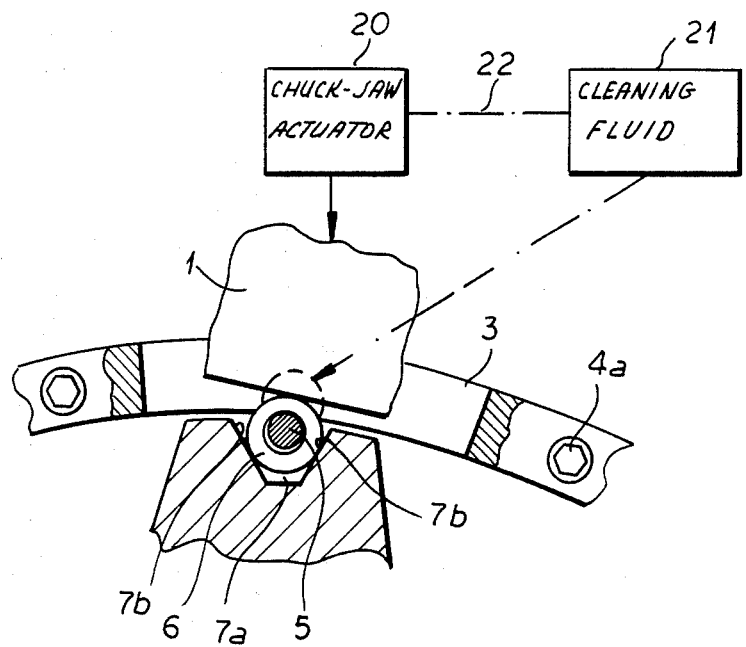
FIG. 4 is a diagrammatic detail illustrating the principles of the invention.
Figure 5:
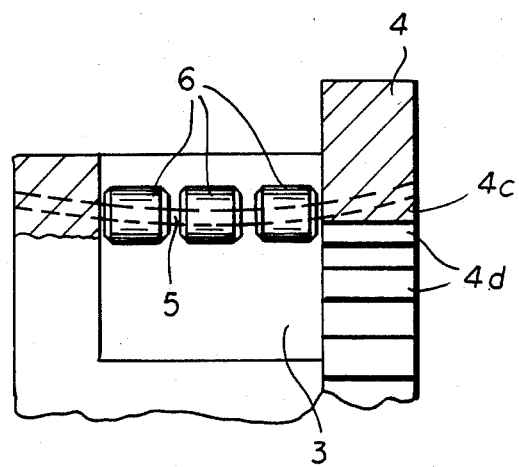
FIG. 5 is a section relevant to FIG. 4.

So that the principles of the invention will be best understood at the outset, reference can be had to FIGS. 4 and 5. FIG. 4 shows a gap 7a defined between a pair of flanks 7b of a gear 7 which forms the workpiece to be machined, e.g. can have its bore internally ground using a conventional internal-grinding tool. Instead of fitting this gear 7 with a roller cage to prevent damage to the gear when it is inserted in the chuck, a ring 4 dimensioned to receive the gear is bolted, e.g. by allen-head screws 4a to a plate 4b forming part of the chuck (see FIG. 2). Thus for a given series of identical workpieces to be machined, a given ring is used.

As detailed below, the front portion 4c of the ring, at least at angularly equispaced regions, can have teeth 4d complementary to the teeth of the gear and assisting, like the guides to be described, in proper alignment.

In the vicinity of each chuck jaw 1 (FIG. 4), the ring 4 has a window 3 spanned by groups of rollers 6 only one group of which has been shown in FIGS. 4 and 5. These rollers are of a diameter such that, when nested in the gaps 7a, they project outwardly to allow the chuck jaw to bear thereagainst.

Each group of rollers 6 is threaded onto a resilient wire 5 spanning opposite sides of the window 3 and allowing radial deflection of the rollers inwardly, e.g. by being drawn slighly out of bores in which the wires are lodged in the ring 4.

The actuating device for the chuck jaws can be any conventional in the art for a powered chuck and is represented at 20 in FIG. 4.

The cleaning blast is supplied by a source 21, which can be coupled as indicated at 22 with the actuator 20 so that, upon opening of the chuck and release of the machined articles a jet of cleaning air or liquid is delivered to the opening 10 and, partially passing through the jaw assembly, cleans chips and debris from the rollers G.

The device has three chuck jaws 1 which are spaced at 120° C. in a membrane-type chuck 2. Each one of the jaws 1 enters into respective window or similar opening or passage 3 of the holding ring 4. The holding ring 4 is mounted in the chuck 2.

Figure 3:
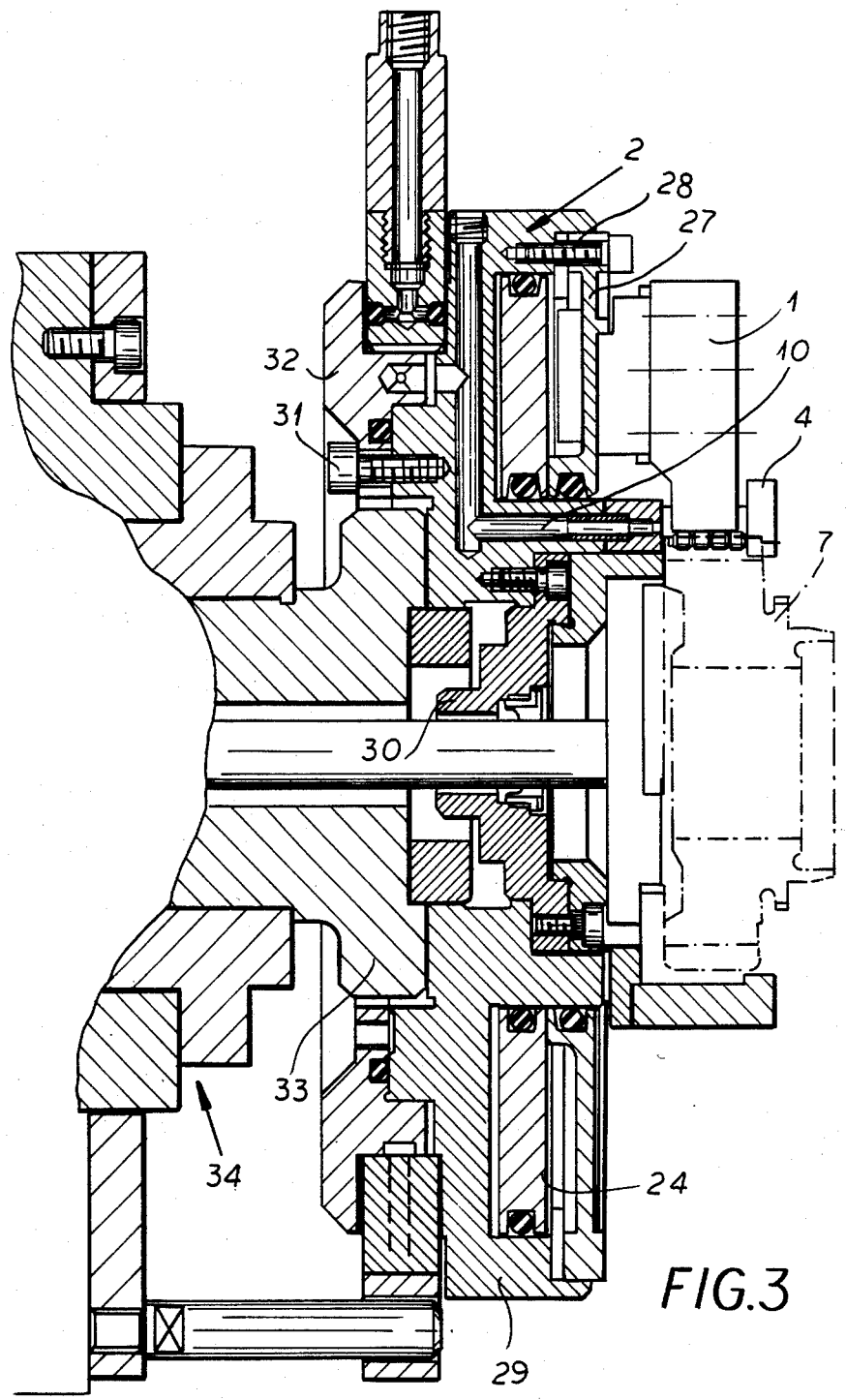
FIG. 3 is a cross section of the chuck similar to FIG. 2 in the region of the conduit for the cleaning medium.

Rollers 6 are then secured on resilient wire pieces 5, in the manner of a roller cage segment, at the holding ring 4 in the region of the openings 3. The arrangement of the rollers 6 is selected in such a way that they enter and fit into the gaps of a respective workpiece to be retained. The gear wheel 7 is shown in dash-dot outline in FIGS. 2 and 3 and this is indicative of a workpiece to be treated.

The chuck jaws 1 engage or operatively contact the rollers 6 during the clamping operation and press them against the gear wheel 7. Accordingly, an accurate and secure clamping or chucking of the workpiece is ensured.

Figure 1:
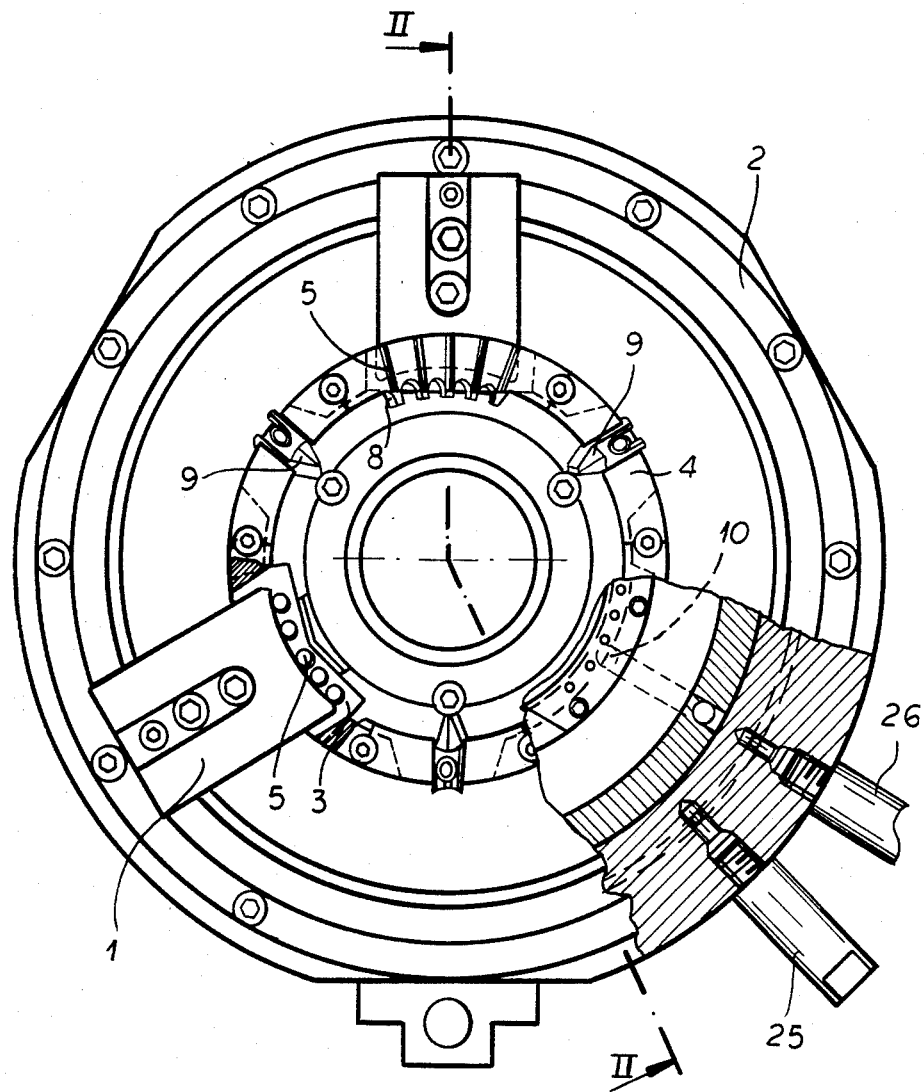
FIG. 1 is front elevation, with some parts shown in cross section, of the device, particularly for a workpiece which is to be ground interiorly.

With reference to FIG. 1, it will be understood that the holding ring 4 is provided over the effective extent of the clamping action exerted by the jaws 1 or, respectively, in the region of the roller cage segments, with the tooth profile 8 which is directed to the axis of rotation of the chuck jaw 1, and this profile 8 is adapted to the respective workpiece 7.

In order to ensure a secure loading of the workpiece into the chuck, without damaging the holding ring 4, input guides 9 are provided, one in line with each chuck jaw 1. The input guides are located on the frontal face or surface of the holding ring 4. Each input guide 9 is in the form of a projecting and adjustable pre-sensor pin, and the tip of each input guide 9 corresponds to the tooth gap of the workpiece to be introduced. In the region of the tip the input guide 9 is shaped in the fasshion of a roof, i.e., somewhat triangular.

For cleaning the rollers 6 during machining, which is inherently accompanied by the production of chips, grindings, and other contamination, a conduit 10 extends through the chuck jaw 1 up to the roller cage segments. The conduit 10 can convey a cleaning medium. During each loading and unloading operation a cleaning medium (liquid or gaseous, e.g. air) is sprayed or blown onto the rollers 6. Actuation of a corresponding valve can be effected automatically in conformity with the control of the chuck.

While other details of the chuck structure are not necessary for the operations to be described, it can be noted that the jaw operating piston 24 (FIG. 3) can be fed with a fluid from a fitting 25, the fitting feeding the orifices 10 being shown at 26 (FIG. 1). The jaw carrying membrane 27 is bolted at 28 onto the chuck body 29 which has a seal 30 and is mounted by screws 31 on a plate 32 fitted onto the splined hub 33 of the rotating structure 34 forming the headstock of a lathe or like machine tool. For a particular series of workpieces or specific workpiece configuration a corresponding holding ring 4 is set in place between the jaws 1 of the chuck 2 and bolted to the body 29 thereof. The workpiece, for example a gear wheel 7, of which the inner diameter is to be cylindrically ground, is introduced into the holding ring 4. The pre-sensor pins 9 arranged at the frontal face of the holding ring 4 ensure, due to the relative movement between the workpiece 7 and the clamping device that the tooth distribution is in full agreement with the arrangement of the roller cage segments of the holding ring 4.

When the piston 24 is driven to the right it deforms the membrane to swing the jaws 1 outwardly and release the workpiece.

During introduction of the workpiece into the holding ring 4 damage is prevented at the holding ring 4. Furthermore, the required cycle time or indexing time for the loading is reduced to the necessary minimum. The jaws 1 of the chuck 2 are now actuated to fasten or "chuck", and with intervention of the rollers 6 they hold the respective workpiece 7 in a centered manner.

When the corresponding surfaces have been treated as desired (for example, grinding interiorly or exteriorly) the chuck jaws 1 are actuated to release the tension on the workpiece 7. The workpiece 7 is taken out and the next workpiece 7 can be introduced. During the exchange the rollers 6 are sprayed with a cleaning medium in order to prevent deviations due to contamination or dirt.

The advantages of the holding ring which can be introduced in the chuck are obvious.

(1) The hitherto usually required and time consuming mounting of a roller cage by hand on the workpiece is not necessary prior to introducing it in the chuck. Accordingly, the cycle time can be appreciably reduced.

(2) It is possible to automatically supply the chuck with workpieces.

(3) The finishing tolerances of or differences between workpieces are reduced to a minimum.

(4) Only one roller cage is required for the rapid exchange of workpieces.

In summary, hitherto it has been customary during machining of workpieces, such as grinding of gear wheels, to slip a roller cage over the respective gear wheel, and the jaws of the chuck would then hold the workpiece by intervention of the rollers of the roller cage. This time consuming operation is made superfluous by the holding ring 4 which is mounted in the chuck 2. The holding ring 4 has window openings 3 in the region near the jaws 1 of the chuck, as well as having in this region fixedly installed roller-cage-type segments. Input guides 9 at the holding ring 4 allow quick, safe, and secure exchange of the workpieces.

We claim:

1. A chuck for holding toothed workpieces comprising:
   a chuck body;
   a plurality of angularly spaced chuck jaws mounted for radial movement on said chuck body;

a holding ring fixed on said chuck body, said holding ring having openings respectively aligned with said jaws and means to retain a respective workpiece;

a plurality of rollers secured to said holding ring and spanning said openings, said rollers being held so as to be able to rest in teeth gaps of a respective workpiece; and a plurality of input guides on said ring for aligning gaps of the respective workpiece with the rollers of said ring.

2. The chuck defined in claim 1 in which a plurality of rollers are provided at each opening of said holding ring and threaded on a resilient wire.

3. The chuck defined in claim 1 wherein said plurality of input grades are located on the frontal surface of said holding ring, and each one of said plurality of input guides is an interchangeable pre-sensor pin which is adapted to project from said frontal surface.

4. A chuck for holding toothed workpieces comprising:

a chuck body;

a plurality of angularly spaced chuck jaws mounted for radial movement on said chuck body;

a holding ring fixed on said chuck body, said holding ring having openings respectively aligned with said jaws and means to retain a respective workpiece;

a plurality of rollers secured to said holding ring and spanning said openings, said rollers being held so as to be able to rest in teeth gaps of a respective workpiece, said plurality of rollers being threaded on a resilient wire;

a plurality of input guides on said ring for aligning gaps of the respective workpiece with the rollers of said ring; and a frontal surface of the holding ring in regions of said rollers having a profile which is complementary to the tooth distribution of the respective workpiece.

5. A chuck for holding toothed workpieces comprising:

a chuck body;

a plurality of angularly spaced chuck jaws mounted for radial movement on said chuck body;

a holding ring fixed on said chuck body, said holding ring having openings respectively aligned with said jaws and means to retain a respective workpiece;

a plurality of rollers secured to said holding ring and spanning said openings, said rollers being held so as to be able to rest in teeth gaps of a respective workpiece;

a plurality of input guides on said ring for aligning gaps of the respective workpiece with the rollers of said ring, said plurality of input guides being located on a frontal surface of said holding ring, and each one of said plurality of input guides being an interchangeable pre-sensor pin adapted to project from said frontal surface and each pre-sensor pin being provided with a radial tip adapted to the shape of the teeth gaps of the workpiece to be treated and said tips having roof-like upper sides.

6. The chuck defined in claim 2, further comprising a conduit, said conduit terminating with exit openings near said rollers, and said conduit being capable of delivering a supply of cleaning medium to said plurality of rollers.

7. The chuck defined in claim 6, further comprising means for activating said conduit to deliver a supply of a cleaning medium upon each unloading operation.

8. The chuck defined in claim 6, wherein said conduit extends through the jaws of the chuck, and the respective exit openings are directed onto a plurality of rollers of an opening.

9. The chuck defined in claim 1, further comprising means for unloading of the workpieces in said ring.

10. The chuck defined in claim 1, further comprising means for loading and unloading of the workpieces automatically in said ring.

11. The chuck defined in claim 1 wherein a group of rollers in each opening are positioned as in a roller cage segment.

12. In a device for holding workpieces having an exterior configuration including gear teeth formations, especially gear wheels, during the machining by inner and/or outer cylindrical grinding, whereby the workpiece is journaled by the chuck jaws of a chuck by the intervention of rollers, the improvement which comprises a holding ring which is formed with window openings in the regions near said chuck jaws of the chuck, means for fixing the holding ring on the chuck, and the holding ring having means for retaining the workpiece and wherein at least in the regions of the window openings rollers are provided which can rest in teeth gaps of the workpiece, and input guides for the workpiece which is to be set in place.

13. The improvement defined in claim 12 wherein in the regions of the window openings which pass the chuck jaws of the chuck, the rollers are journaled as in roller cage segments.

14. In a device for holding workpieces having an exterior configuration including gear teeth formations, especially gear wheels, during the machining by inner and/or outer cylindrical grinding, whereby the workpiece is journaled by the chuck jaws of a chuck by the intervention of rollers, the improvement which comprises a holding ring which is formed with window openings in the regions near said chuck jaws of the chuck, means for fixing the holding ring on the chuck, and the holding ring having means for retaining the workpiece and wherein at least in the regions of the window openings rollers are provided w hich can rest in teeth gaps of the workpiece, input guides for the workpiece which is to be set in place, the roller being journaled as in roller cage segments in the regions of the window openings which pass the chuck jaws of the chuck, and wherein a frontal surface of the holding ring in the regions of the roller cage segment having a profile which is adapted to the tooth distribution or division of the workpiece to be treated.

15. In a device for holding workpieces having an exterior configuration including gear teeth formations, especially gear wheels, during the machining by inner and/or outer cylindrical grinding, whereby the workpiece is journaled by the chuck jaws of a chuck by the intervention of rollers, the improvement which comprises a holding ring which is formed with window openings in the regions near said chuck jaws of the chuck, means for fixing the holding ring on the chuck, and the holding ring having means for retaining the workpiece and wherein at least in the regions of the window openings rollers are provided which can rest in teeth gaps of the workpiece, input guides for the workpiece which is to be set in place, the roller being journaled as in roller cage segments in the regions of the window openings which pass the chuck jaws of the chuck, and the input guides on the frontal surface of the holding ring being formed as interchangeable pre-sensor pins projecting over the frontal face of the ring.

16. The improvement defined in claim 15 wherein the pre-sensor pins are provided with radial tips which are adapted to the shape of the tooth gaps of the workpiece to be treated which tips have roof-like upper sides.

17. The improvement defined in claim 13, further comprising in the regions of the roller cage segments, exit openings of a conduit which can be subjected to the flow of a cleaning medium through which during each loading and unloading operation cleaning medium is directed at the rollers of the roller cage segments.

18. The improvement defined in claim 17 wherein the conduits for the cleaning medium extend through the chuck jaws of the chuck, and the exit openings for the cleaning medium are directed onto the rollers of the roller cage segments.

* * * * *